(12) United States Patent
Ragab

(10) Patent No.: US 6,578,456 B2
(45) Date of Patent: Jun. 17, 2003

(54) MACHINE TOOL AND WORKPIECE CHUCK

(75) Inventor: Mahmoud Ragab, Hochdorf (DE)

(73) Assignee: Index-Werke GmbH & Co. KG Hahn & Tessky, Esslingen (DE)

( * ) Notice: Subject to any disclaimer, the term of this patent is extended or adjusted under 35 U.S.C. 154(b) by 0 days.

(21) Appl. No.: 09/838,534

(22) Filed: Apr. 19, 2001

(65) Prior Publication Data

US 2002/0020259 A1 Feb. 21, 2002

(30) Foreign Application Priority Data

Apr. 20, 2000 (DE) .......................... 100 19 775

(51) Int. Cl.⁷ .......................... B23B 15/00; B23B 31/36
(52) U.S. Cl. .................. 82/120; 82/151; 279/6
(58) Field of Search .................. 82/118, 142, 120, 82/151; 279/134, 5, 6; 29/27 R, 27 C; 409/165, 166, 167, 168

(56) References Cited

U.S. PATENT DOCUMENTS

| | | | | |
|---|---|---|---|---|
| 981,566 A | * | 1/1911 | Jarvis | 279/6 |
| 2,456,776 A | * | 12/1948 | Faust | 192/142 A |
| 3,357,711 A | * | 12/1967 | Fischer | 279/6 |
| 3,680,876 A | * | 8/1972 | Okada | 279/5 |
| 3,685,845 A | | 8/1972 | Fischer et al. | |
| 3,881,735 A | * | 5/1975 | Joyce | 279/137 |
| 4,080,853 A | * | 3/1978 | Goto | 82/142 |
| 4,321,845 A | | 3/1982 | Szabo et al. | |
| 4,669,741 A | * | 6/1987 | Rohm | 279/121 |
| 4,966,375 A | * | 10/1990 | Rohm et al. | 279/106 |
| 5,471,900 A | | 12/1995 | Corwin et al. | |
| 5,544,556 A | * | 8/1996 | Jones | 279/6 |
| 6,128,985 A | * | 10/2000 | Muster et al. | 82/1.4 |

FOREIGN PATENT DOCUMENTS

CH 659 021 12/1986

* cited by examiner

Primary Examiner—Steven C. Bishop
(74) Attorney, Agent, or Firm—Barry R. Lipsitz; Douglas M. McAllister

(57) ABSTRACT

In order to improve a machine tool for the turning of workpieces with eccentric sections, comprising a tool support, a workpiece spindle which comprises a workpiece chuck, in which the workpiece can be clamped with a variably adjustable eccentricity, wherein the workpiece chuck has a chuck housing, a collet actuation and a collet support arranged in the chuck housing and having a collet held therein, the collet being adapted to be brought into concentric or eccentric adjustable positions relative to the spindle axis, in such a manner that the adjustment of the collet support relative to the chuck housing can be brought about more simply it is suggested that an adjusting element be provided on the machine tool which is movable towards the workpiece chuck for the adjustment or the respective adjustable position of the collet and may be brought into operative connection with the collet support and that in this operative connection the relative movement between the collet support and the chuck housing for altering the adjustable position be controllable by means of the machine control by way of the at least one controlled axis.

33 Claims, 6 Drawing Sheets

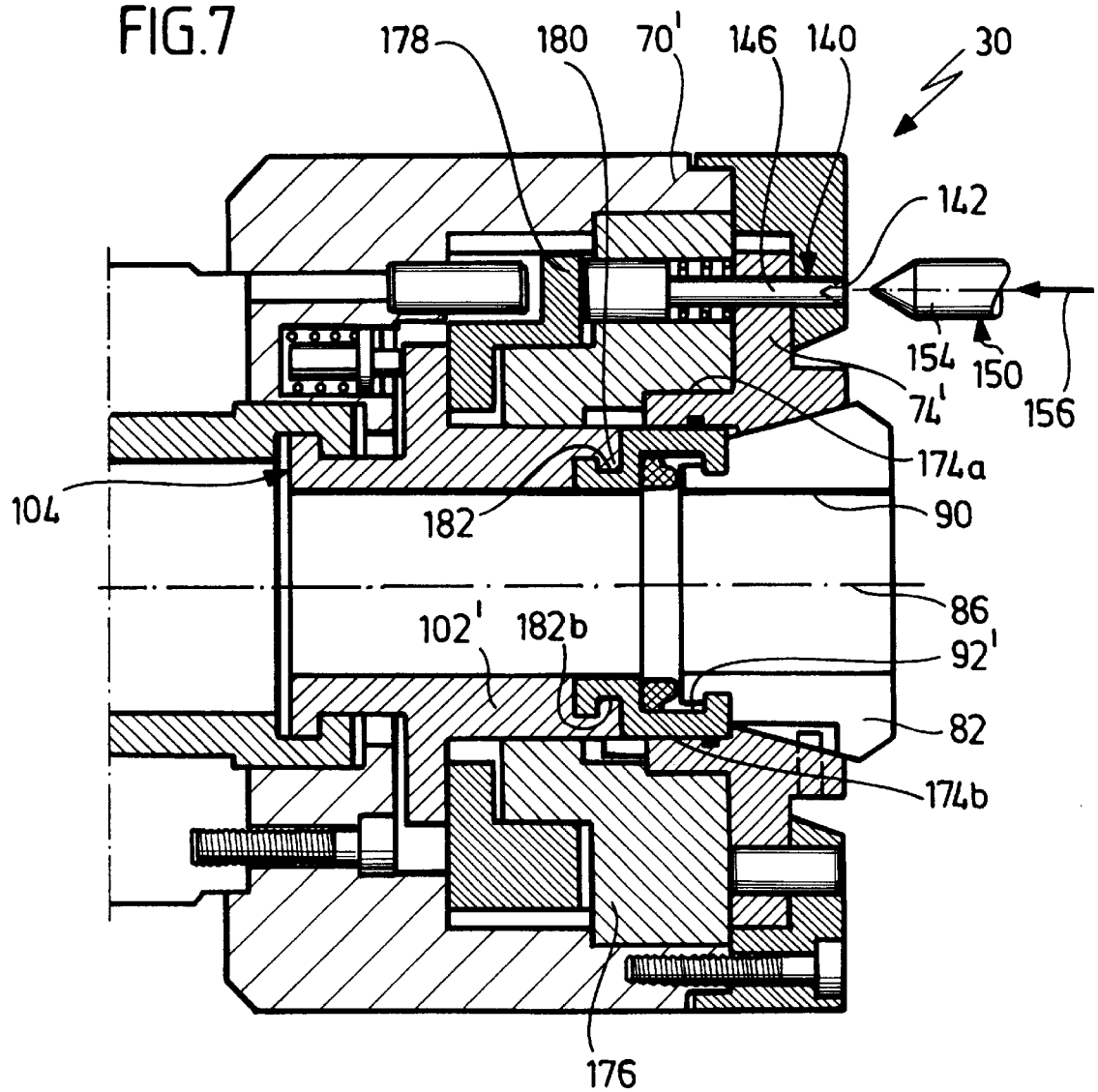

MACHINE TOOL AND WORKPIECE CHUCK

The invention relates to a machine tool for the turning of workpieces with eccentric sections, comprising a tool support movable in the direction of at least one axis, a workpiece spindle drivable for rotation about a spindle axis and comprising a workpiece chuck, in which the workpiece can be clamped with a variably adjustable eccentricity, wherein the workpiece chuck has a chuck housing, a collet actuation and a collet support arranged in the chuck housing and having a collet held thereon, this collet being adapted to be brought into concentric or eccentric positions relative to the spindle axis as a result of movement of the collet support relative to the chuck housing.

A machine tool of this type is known from the state of the art but, in this case, a stepless adjustment of the collet support relative to the chuck housing can be adjusted only manually, in particular, using measuring tools for the exact determination of the eccentricity of the respective adjustable position.

The object underlying the invention is therefore to improve a machine tool of the generic type in such a manner that the adjustment of the collet support relative to the chuck housing can be brought about more simply.

This object is accomplished in accordance with the invention, in a machine tool of the type described at the outset, in that the machine tool has at least one axis controlled by a machine control, that an adjusting element is provided on the machine tool and this element can be moved towards the workpiece chuck for the adjustment of the respective adjustable position of the collet and can be brought into operative connection with a receiving means connected to the collet support and that in this operative connection between the adjusting element and the collet support the relative movement between the collet support and the chuck housing for the alteration of the adjustable position can be controlled by means of the machine control by way of the at least one controlled axis.

The advantage of the inventive solution is to be seen in the fact that with it it is possible to use the machine control, which is generally present in any case, to carry out the respective adjustable position of the collet relative to the chuck housing so that, on the one hand, the complicated manual adjustment can be dispensed with and, on the other hand, there is even the advantage that during a machining cycle a variation of the adjustable position is possible by means of corresponding specifications of the machine control.

This may be achieved particularly favorably when the adjusting element can be moved by the machine control relative to the receiving means in a direction of engagement which extends transversely to the direction of movement of the collet support relative to the chuck housing.

As a result of a direction of engagement extending in such a manner the adjusting element and the receiving means may be designed as interacting form-locking elements which can be brought into engagement with one another simply due to the movement in the direction of engagement in order to provide the connection between the adjusting element and the collet support.

In principle, the direction of engagement can always be aligned in different directions. In this respect, a solution which is particularly favorable with respect to the conditions in a machine tool provides for the direction of engagement to extend approximately parallel to the spindle axis.

In principle, it would be conceivable to move not only the collet support relative to the chuck housing during the adjustment of the adjustable position but, at the same time, to move the chuck actuation with it in order to be able to keep the workpiece clamped in the collet in an unchanged manner even during variation of the adjustable position.

This is constructionally complicated.

For this reason, one advantageous solution provides for the workpiece chuck to have an actuating element which can be actuated at least indirectly by the machine control and with which the collet actuation can be acted upon in the direction of a holding position of the collet still holding the workpiece in the collet.

This means that with this solution the clamping of the workpiece in the collet is not brought about in the customary manner, i.e., with the customary cocking cylinder since the forces applied by the cocking cylinder and normally required for a secure clamping during the machining are so great that an adjustment of the collet support relative to the chuck housing is no longer possible with any justifiable expenditure of force.

For this reason, the customary cocking cylinder is deactivated for the adjustment of the collet support relative to the chuck housing and only the collet actuation is acted upon in such a manner that the workpiece is still held by the collet in its position relative to the collet and is not released in it.

For example, it would be conceivable for this purpose to provide an additional cocking cylinder to the customary cocking cylinder as actuating element which is in a position to apply such a small clamping force which still allows the workpiece to be fixed in position in the collet but, at the same time, the collet support to also be moved relative to the chuck housing.

This solution is constructionally complicated. For this reason, a simplified solution provides for the actuating element to be actuatable due to action on the workpiece chuck from outside.

Such action on the workpiece chuck from outside can be brought about in the most varied of ways. For example, it would be conceivable to provide a separate actuating device outside the workpiece chuck which acts on the actuating element in a defined position of the workpiece chuck.

A simple possibility for realizing such an actuating device provides for this to be formed by the tool support so that the actuating element can be actuated by the tool support.

Since, in the inventive sense, the workpiece chuck must be acted upon in any case by means of the adjusting element in order to adjust the collet support relative to the chuck housing, a particularly preferred embodiment provides for the actuating element to also be actuatable by the adjusting element.

A particularly favorable solution provides for the actuating element to be arranged on the collet support and to be movable together with it during the alteration of the adjustable position relative to the chuck housing so that the actuating element co-migrates during the movement of the collet support relative to the chuck housing due to the adjusting element and thus can also be coactuated by the adjusting element.

Fundamentally, it would be conceivable for the adjusting element to act on the inventive workpiece chuck in two ways, namely, on the one hand, on the receiving means and, on the other hand, on the actuating element.

A solution which is particularly favorable from a constructional point of view provides for the actuating element to bear the receiving means for the adjusting element so that the adjusting element can come into operative connection with the receiving means in a particularly simple manner and, at the same time, can actuate the actuating element.

An expedient construction therefore provides for the actuating element to be movable in the direction of engagement of the adjusting element so that as a result of movement of the adjusting element in the direction of engagement an actuation of the actuating element is brought about at the same time in order to act on the collet actuation.

In this respect, it has proven to be particularly favorable from a constructional point of view when the actuating element is movable approximately parallel to the spindle axis.

With respect to the arrangement of the adjusting element on the inventive machine tool, the most varied of possibilities are conceivable. For example, it would be conceivable to provide a separate moving device for the adjusting element.

However, a solution which is particularly favorable from a constructional point of view provides for the adjusting element to be held on the tool support movable by the machine control so that the axes provided for the tool support and controllable by the machine control are available at the same time as axes of movement for the movement of the adjusting element.

In this respect, it would be conceivable to arrange the adjusting element on the tool support in addition to the tool. A particularly favorable solution provides, however, for the adjusting element to be arranged in the tool support instead of a tool.

In this respect, the tool support can be designed as a single tool support and the adjusting element can be interchanged each time for a tool when the adjusting element is required.

However, it is also conceivable to design the tool support as a multiple tool support, for example, as a tool turret and to equip one tool station with the adjusting element at least when an alteration in the adjustable position of the collet relative to the chuck housing is imminent.

The inventive concept may be realized particularly favorably when the tool support is movable by the machine control in the direction of engagement of the adjusting element.

Furthermore, it is favorable when the tool support is movable by the machine control transversely to the direction of engagement of the adjusting element so that the adjusting element may be aligned relative to the receiving means in a simple manner in order to act on the receiving means.

A particularly advantageous embodiment provides for a securing of the collet support in position relative to the machine base to be achievable by means of the adjusting element and for the relative movement between the chuck housing and the collet support to be achievable by means of a rotation of the workpiece spindle about the C axis controlled by the machine control.

This solution provides for the C axis of the workpiece spindle to be utilized for varying the adjustable position of the collet support relative to the chuck housing while the adjusting element merely serves to secure the collet support relative to the machine base.

This solution offers itself, in particular, when the collet support is mounted in the chuck housing for rotation about an axis eccentric to the spindle axis.

This solution can, however, also be realized when the collet support is mounted so as to be linearly displaceable in the chuck housing.

Another advantageous solution provides for a movement of the collet support relative to the chuck housing to be achievable by means of the adjusting element, when the workpiece spindle is stationary in that the collet support is movable by means of an axis controllable by the machine control and moving the adjusting element relative to the chuck housing, i.e. the adjusting element is movable, for example, relative to the chuck housing by means of the tool support movable along at least one axis.

The invention also relates to a workpiece chuck for a tool spindle of a machine tool rotatable about a spindle axis.

The object specified at the outset is accomplished in accordance with the invention, in a workpiece chuck of this type for a tool spindle of a machine tool rotatable about a spindle axis, in which the workpiece can be clamped with adjustable eccentricity in relation to the spindle axis, wherein the workpiece chuck has a chuck housing, a collet actuation and a collet support arranged in the chuck housing and having a collet held in it, this collet being adapted to be brought into concentric or eccentric adjustable positions relative to the spindle axis as a result of movement of the collet support relative to the chuck housing, in that a receiving means is provided on the collet support for the adjustment of the adjustable positions of the collet, this receiving means being adapted to be brought into operative connection with an adjusting element of the machine tool so that in this operative connection between the adjusting element and the collet support the relative movement between the collet support and the chuck housing for altering the adjustable position can be brought about.

The advantage of the inventive solution is thus to be seen in the fact that with it action on the workpiece chuck is possible in a simple manner in order to adjust the collet support relative to the chuck housing.

For example, the operative connection between the receiving means and the adjusting element could be brought about by means of a force-locking connection, for example, clamping of the receiving means by the adjusting element. It is, however, particularly favorable when the operative connection between the receiving means and the adjusting element is brought about by way of form locking.

A particularly expedient solution provides for the form-locking connection of adjusting element and receiving means to be achievable by means of a relative movement in a direction of engagement which extends transversely to the direction of movement of the collet support relative to the chuck housing.

Adjusting element and receiving means may be brought into operative connection particularly expediently when the direction of engagement extends approximately parallel to the spindle axis.

In conjunction with the embodiments of the inventive workpiece chuck explained thus far, details have been given only on the adjustment of the collet support relative to the chuck housing.

In order to be able to carry out an adjustment of the collet support relative to the chuck housing with a justifiable expenditure of force it is necessary to release the customary action on the collet by means of the cocking cylinder since the forces generated by the cocking cylinder for clamping the workpiece by means of the collet prevent any movement of the collet support relative to the chuck housing with a reasonable expenditure of force.

When the clamping of the workpiece in the collet is released, this can become loose in the collet and, in particular, the positioning of the workpiece relative to the collet and thus relative to the workpiece spindle may be altered so that the precision of the machining is lost.

For this reason, it is provided in a particularly advantageous embodiment of the inventive workpiece chuck for the collet actuation to be acted upon in the direction of a holding position of the collet still holding the workpiece in the collet during the relative movement between the collet support and the chuck housing.

This could, for example, be achievable in that an additional cocking cylinder or an additional step of the available cocking cylinder is provided which allows clamping of the workpiece by means of the collet with a small clamping force.

The clamping force is preferably determined such that the workpiece is still held securely in the collet without any machining.

In this respect, the clamping force is preferably smaller than approximately 5%, preferably smaller than approximately 1%, even better approximately 0.5% of the customary clamping force.

Another solution provides, for example, for an elastic biasing means which sees to it even when the cocking cylinder is disengaged that the collet actuation still acts on the collet with an adequately large force in order to still hold the workpiece securely in a clamped manner without any machining.

A particularly preferred solution provides for the workpiece chuck to have an actuating element which can be actuated from outside the same and with which the collet actuation can be acted upon in the direction of a holding position of the collet still holding the workpiece in the collet.

As a result of such an actuating element it is possible to act on it in a concerted manner and thus to still hold the workpiece securely in the collet in a concerted manner when a relative movement of collet support and chuck housing is intended to take place.

A particularly advantageous design of the inventive workpiece chuck provides for the actuating element to be actuatable as a result of action on the workpiece chuck from outside.

Since action on the workpiece chuck by means of the adjusting element is, in any case, necessary for varying the adjustable position, a particularly favorable solution provides for the actuating element to be actuatable by means of the adjusting element.

In order to be able to carry out such an actuation by means of the adjusting element, it has proven to be particularly favorable when the actuating element is arranged on the collet support and is movable together with it during the alteration of the adjustable position relative to the chuck housing so that during the adjustment of the collet support the moving element can be acted upon at the same time in a simple manner.

In principle, it would be conceivable to act with the adjusting element in two ways, namely, on the one hand, on the actuating element and, on the other hand, on the receiving means. It is, however, particularly favorable when the actuating element bears the receiving means for the adjusting element so that any action on the receiving means corresponds at the same time to an action on the actuating element.

The actuating element can be acted upon by means of the adjusting element in a particularly simple manner when the actuating element is mounted for movement in the direction of engagement of the adjusting element.

A solution, with which the actuating element is movable approximately parallel to the spindle axis, may be realized particularly advantageously from a constructional point of view.

With respect to the type of movability of the collet support relative to the chuck housing, no further details have so far been given. For example, one advantageous solution provides for the collet support to be rotatable in the chuck housing about an axis which is arranged eccentrically but parallel to the spindle axis and for the collet to be arranged with its axis of symmetry eccentrically but parallel to this axis.

As a result, it is possible to vary the distance between the axis of symmetry and the spindle axis by turning the collet support relative to the chuck housing and thus to arrange the collet in different concentric or eccentric adjustable positions relative to the spindle axis.

Alternatively thereto, a different solution provides for the collet support to be displaceable linearly in the chuck housing so that as a result of linear displacement of the collet support the collet can either be arranged concentrically to the spindle axis or can be arranged eccentrically in the direction of two oppositely extending directions, wherein the axis of symmetry of the collet always extends parallel to the spindle axis.

The inventive workpiece chuck may be used particularly expediently when this is used in a machine tool corresponding to any of the embodiments described above.

Additional features and advantages of the inventive solution are the subject matter of the following description as well as the drawings illustrating several embodiments.

Figure 1:
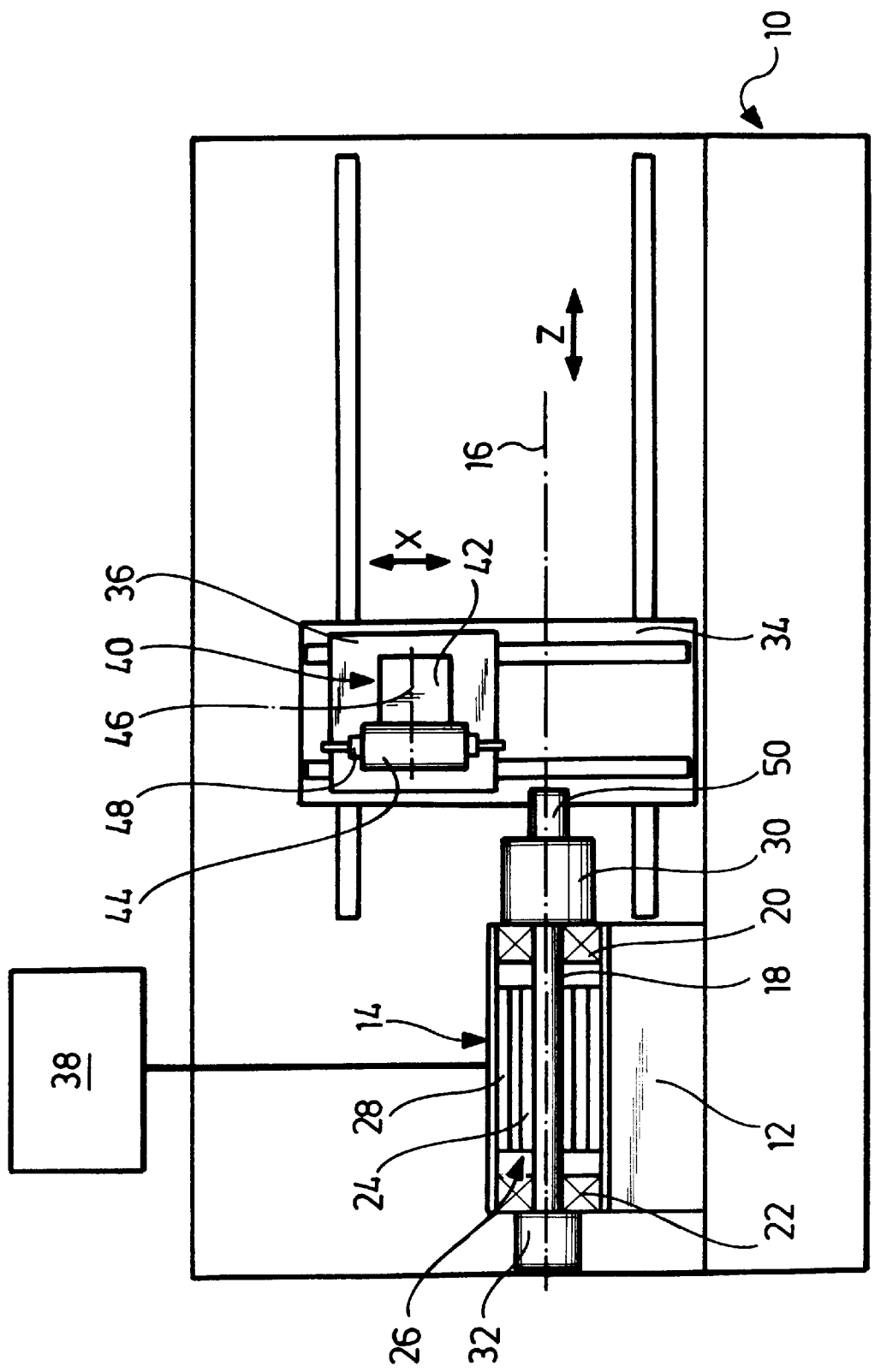
FIG. 1 shows a plan view of an inventive machine tool with a spindle cut open.
Figure 3:
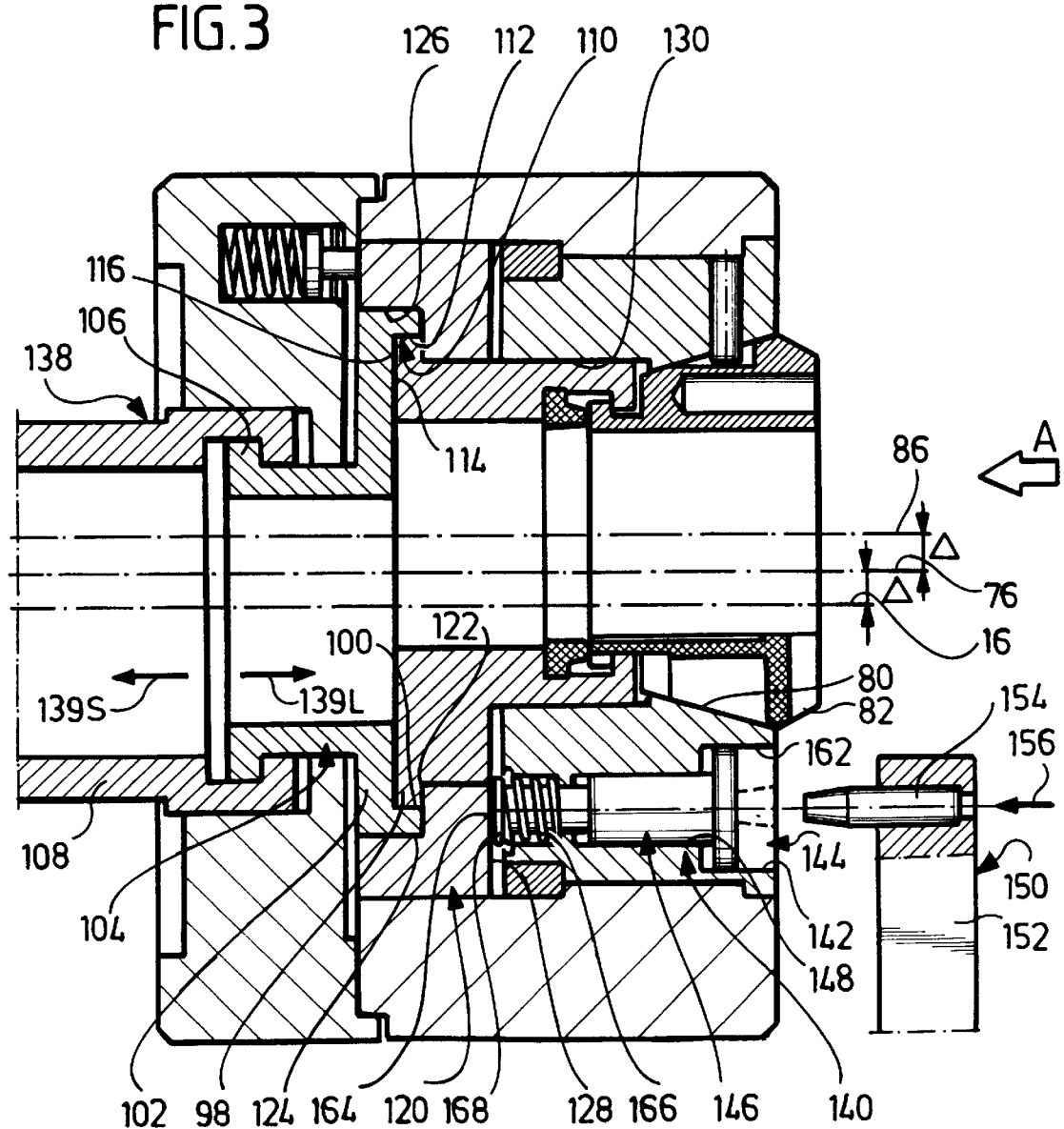
FIG. 3 shows a section parallel to the spindle axis through a first embodiment of an inventive workpiece chuck, with which the collet support is turned relative to the chuck housing such that the maximum eccentricity of the collet relative to the spindle axis is present.

FIG. 7 shows a section similar to FIG. 3 through a second embodiment of an inventive workpiece clamping device One embodiment of an inventively equipped machine tool illustrated in FIG. 1 comprises a machine base 10, on which a headstock 12 is held, in which a workpiece spindle designated as a whole as 14 is mounted for rotation about a spindle axis 16.

The workpiece spindle 14 comprises, for example, a spindle guide tube 18 and is mounted with this for rotation on spindle bearings 20 and 22 arranged at a distance from one another.

A rotor 24 of a spindle motor, which is designated as a whole as 26 and, in addition, has a stator 28 surrounding the rotor 24, is seated on the spindle guide tube 18 between the two spindle bearings 20 and 22.

A workpiece chuck designated as a whole as 30 is arranged on a side of the front spindle bearing 20 facing away from the spindle motor 26 and this chuck is non-rotatably connected to the spindle guide tube 18 and drivable by this for rotation about the spindle axis 16.

Furthermore, a cocking cylinder 32, with which the workpiece chuck 30 can be actuated, is on a side of the rear spindle bearing 22 facing away from the spindle motor 22.

Furthermore, a Z slide 34 is also arranged on the machine base 10, this Z slide being movable in a Z direction parallel to the spindle axis 16 and having an X slide 36 seated on it, which is movable in X direction at right angles to the spindle axis 16 and, for its part, bears a tool support designated as a whole as 40.

The tool support 40 is designed, for example, as a turret and comprises a turret housing 42 which is seated on the X slide 36 and on which a turret head 44 is mounted for rotation about a turret axis 46.

The turret head 44 thereby bears a plurality of tools 48, with which a workpiece 50 clamped in the workpiece chuck 30 can be machined.

A stored-program machine control 38 is provided for displacing the Z slide 34 and the X slide 36 and with it the turret head 44 and its turret axis 46 can also be rotated into individual indexing positions. Moreover, the spindle motor 26 can preferably be operated by the machine control 38 as a controlled C axis.

Figure 2:
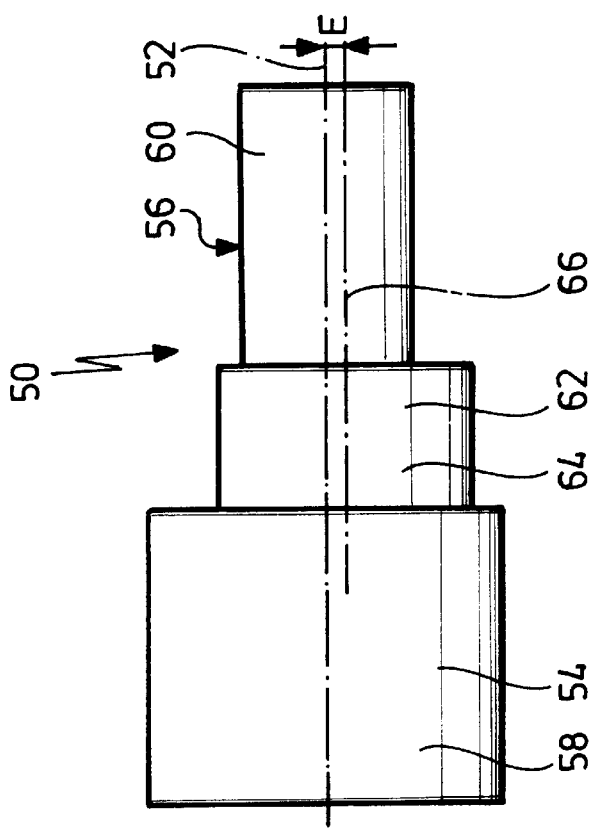
FIG. 2 shows a schematic view of an exemplary workpiece.
Figure 6:
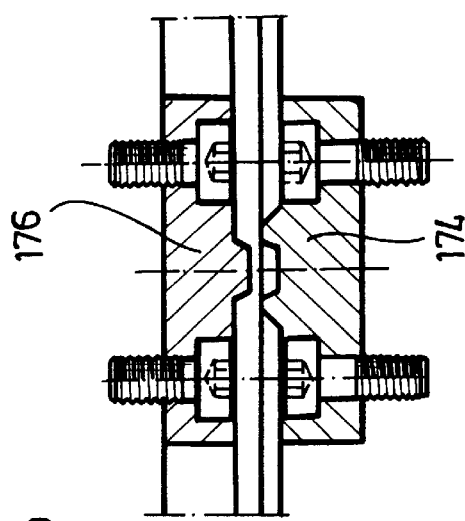
FIG. 6 shows a section along line 6—6 in FIG. 4.

The workpiece 50 is, as illustrated in FIG. 2, intended to be machined, for example, such that it has two sections 54 and 56 which are arranged concentrically to a workpiece axis 52, are provided, for example, with casing surfaces 58 and 60 cylindrical to the workpiece axis 52 and are to be machined by one or several of the tools 48.

Furthermore, a section 62 is provided between the sections 54 and 56 which is intended to be machined such that a casing surface 64 thereof extends concentrically to an axis 66 which, in relation to the workpiece axis 52, extends radially offset to the workpiece axis 52 by an amount E.

A first embodiment of the inventive workpiece chuck 30 illustrated in FIGS. 3 to 6 comprises a chuck housing 70 which surrounds a collet support 74 in a ring shape and has, for mounting the collet support 74, a cylindrical bearing surface 72, the cylinder axis 76 of which extends so as to be radially offset by an amount Δ but parallel to the spindle axis 16.

The collet support 74 is guided so as to be rotatable on the cylindrical bearing surface 72 with an outer guide surface 78, but non-displaceable in the direction of the cylinder axis 76, the cylinder axis of which coincides with the cylinder axis 76.

A receiving means 80, for example, in the form of a conical surface for a collet designated as a whole as 82 is arranged in the collet support 74, wherein the receiving means 80 has an axis of symmetry 76 which extends parallel to the spindle axis 16 but is likewise arranged so as to be offset by the amount Δ in relation to the cylinder axis 76.

The collet 82 is thereby designed as a conventional collet and abuts with outer sides 88 of its clamping fingers 84 on the conical surface forming the receiving means 80. As a result, a workpiece receiving means 90, which is arranged in the collet 82 and surrounded by the clamping fingers 84, is designed as a cylinder chamber extending symmetrically to the axis of symmetry 86 but is variable in its radial extension in relation to the axis of symmetry 86 depending on whether the collet 82 is acted upon with tension by the cocking cylinder 32 or not.

For acting upon the collet 82 with tension, a tension sleeve designated as a whole as 92 is provided which engages with a flange ring 94 in an actuating groove 96 of the clamping fingers 84 so that the collet 82 can be drawn into the conically tapering collet receiving means 80 or pushed out of it by means of the tension sleeve 92.

In this respect, the flange ring 94 extends symmetrically to the axis of symmetry 86 of the collet receiving means 80. The tension sleeve 92 comprises, in addition, on its side located opposite the first flange ring 94 a second flange ring 96 which extends symmetrically to the cylinder axis 76 and is mounted in an annular groove which is designated as a whole as 100 and likewise extends rotationally symmetrically to the cylinder axis 76.

The annular groove 100 is thereby formed by a front part 102 of a tension element 104, wherein the front part 102 is connected via a bayonet connection 106 to a rear part 108 of the tension element 104 which extends through the spindle guide tube 18 as far as the cocking cylinder 32.

The front part 102 of the tension element 104 thereby forms a step-like recess 110 with a wall 112 extending cylindrically around the cylinder axis 76 and a flange surface 114 which extends at right angles to the cylinder axis 76 and on which the tension sleeve 92 abuts with a rear end side 116.

The recess 100 engages over a holding ring 120 which extends with a flange surface 122 parallel to the flange surface 114 so that these two flange surfaces 114 and 122 form the side walls of the annular groove 100 extending radially to the cylinder axis 76 whereas the cylindrical wall 112 forms the groove base.

The holding ring 120 is preferably fixed in position on the front part 102 in that it engages over an outer surface 124 of the front part 102 extending cylindrically to the cylinder axis 76 and is seated on this with an inner surface 126 facing the outer surface 124 and fixed in position.

Furthermore, this holding ring 120 has an end face 128 facing the collet support 74.

The tension sleeve 92 is, in addition, held non-rotatably in a central opening 130 of the collet support 74 which extends rotationally symmetrically to the axis of symmetry 86 and is guided in this opening 130 for displacement in the direction of the axis of symmetry 86 so that a tensioning force can be transferred from the tension element 104 to the collet 82 by means of the tension sleeve 92.

As a result of the mounting of the collet support 74 with bearing surfaces 72 and guide surfaces 78 extending rotationally symmetrically to the cylinder axis 76 such that the cylinder axis 76 represents the axis of rotation for the collet support 74 relative to the chuck housing 70 and the rotational mounting of the second flange ring 98 of the tension sleeve 92 in the annular groove 100 extending rotationally symmetrically to the cylinder axis 76, the unit consisting of the collet support 74, the collet 82 and the tension sleeve 92 is rotatable about the cylinder axis 76 as axis of rotation relative to the chuck housing 70 and relative to the front part 102 of the tension element 104, wherein in the extreme position illustrated in FIG. 3 the radial offset of the axis of symmetry 86 in relation to the cylinder axis 76 by the amount Δ is added, in addition, to the radial offset of the cylinder axis 76 in relation to the spindle axis 16 by the amount Δ so that, altogether, the axis of symmetry 86 is, in the extreme position illustrated in FIG. 3, offset radially in relation to the spindle axis 16 by the amount 2Δ whereas the cylinder axis 76 is located centrally between the axis of symmetry 86 and the spindle axis 16.

Figure 4:
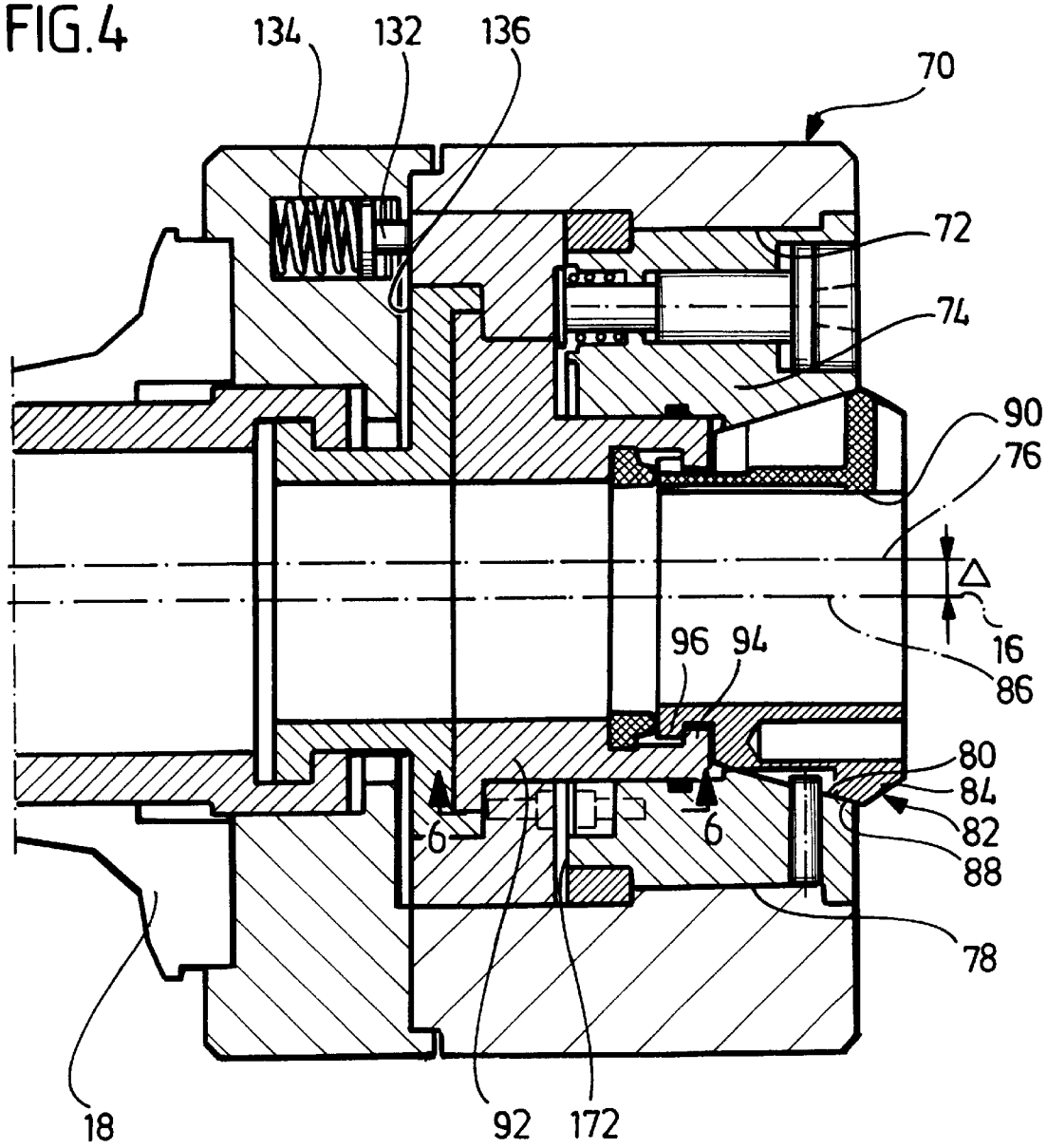
FIG. 4 shows a section similar to FIG. 3 through the first embodiment, wherein the collet support is turned relative to the chuck housing such that the collet is arranged concentrically to the spindle axis.

In the other extreme position illustrated in FIG. 4, the unit consisting of the collet support 74 of the collet 82 and the tension sleeve 92 is turned such that the offset of the axis of symmetry 86 in relation to the cylinder axis 76 by the amount Δ and the offset of the cylinder axis 76 in relation to the spindle axis 16 by the amount Δ exactly nullify one another and so the axis of symmetry 86 extends coaxially to the spindle axis 1.6.

In this position of the collet support 74 illustrated in FIG. 4, the collet receiving means 80 is again located so as to be rotationally symmetrical to the spindle axis 16 and, consequently, the workpiece receiving means 90 is, in turn, also arranged so as to be rotationally symmetrical to the spindle axis 16, as in a conventional workpiece chuck.

In order to ensure that the collet 82 transfers when the cocking cylinder 32 is disengaged and thus the tensioning effect of the tension element 104 is discontinued, several pressure members 132 are arranged in the chuck housing 70 and these are acted upon by a pressure spring 134 in the direction of the holding ring 120 and thereby act on a rear end face 136 of the holding ring 120 which is arranged so as to be located opposite the front end face 128 of the holding ring 120.

The cocking cylinder 32 thus forms, together with the tension element 104, the holding ring 120, the tension sleeve 92 and the pressure members 132 with the pressure springs 134, a collet actuation which is designated as a whole as 138 and allows rotation of the tension sleeve 92 about the cylinder axis 76.

When the cocking cylinder 32 is inactive, the pressure members 132 displace the holding ring 120 and with it the front part 102 of the tension element 104 in release direction 139L of the collet support 74 and this likewise results in a displacement of the tension sleeve 92 in this direction which, for its part, then acts with the first flange ring 94 on the collet 82 in such a manner that this is pushed out of the conical receiving means 80 to such an extent that the clamping fingers 84 transfer into their maximum opened position.

However, if the cocking cylinder 32 acts on the tension element 104 in clamping direction 139S, the holding ring 120 is displaced contrary to the force of the pressure member 132 and of the pressure springs 134 and thus the collet 82 is drawn into the conical receiving means 80 and the workpiece 50 inserted in the workpiece receiving means 90 of the collet 82 is clamped.

By turning the collet support 74 relative to the chuck housing 70 it is also possible to produce workpieces 50 as illustrated in FIG. 2, wherein the turning of the sections 54 and 56, for example, takes place in the position of the collet support 74 which is illustrated in FIG. 4 and in which the axis of symmetry 86 coincides with the spindle axis 16.

Since the turning of the workpiece 50 clamped in the working spindle 14 by means of the workpiece chuck 30 is always brought about rotationally symmetrical to the spindle axis 16 with the use of one of the tools 48, the workpiece axis 52 is coaxial to the spindle axis 16 during machining of the sections 54 and 56.

In order to be able to machine the section 62 of the workpiece 50, the axis 66 of which is offset by the eccentricity E in relation to the workpiece axis 52, the collet support 74 is turned relative to the chuck housing 70 whilst moving the workpiece axis 52 out of its position coaxial to the spindle axis 16 to such an extent until the axis 66 coincides with the spindle axis 16.

If, in the extreme case, the eccentricity E, i.e. the amount, by which the axis 66 is offset in relation to the workpiece axis 52, is equal to 2Δ, the collet support 74 is turned relative to the chuck housing 70 as far as the position illustrated in FIG. 3, wherein the workpiece axis 52 always extends coaxially to the axis of symmetry 86 of the workpiece receiving means 90 so that, in the position illustrated in FIG. 3, the workpiece axis 52 is offset radially in relation to the spindle axis 16 by the amount 2Δ.

If the workpiece 50 is now machined with the tool 48, a surface results which is rotationally symmetrical to the spindle axis 16 and represents the casing surface 64 of the section 62, wherein the axis 66 to the resulting casing surface 64 is coaxial to the spindle axis 16.

Figure 5:
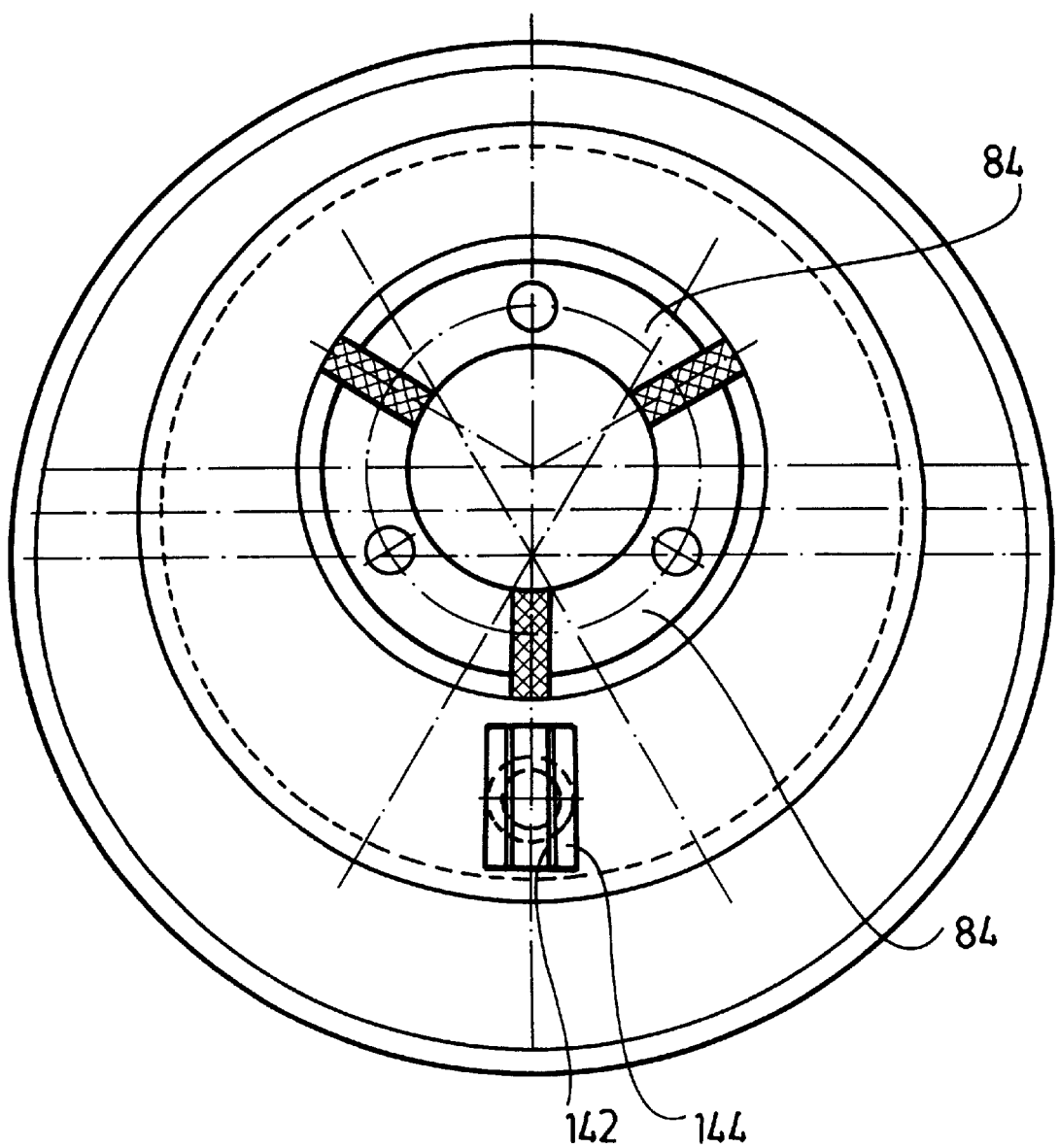
FIG. 5 shows a plan view in the direction of arrow A in FIG. 3.

In order to be able to carry out such a rotary movement of the collet support 74, an actuating element 140 is provided in the collet support 74, as illustrated in FIGS. 3, 4 and 5 and this element has a receiving means 142 in the form of a groove which extends radially to the cylinder axis 76 and can be brought into engagement with an adjusting element 150 which has an arm 152, at the front end of which a pin 154 is arranged which can be brought into engagement with the receiving means 142.

The adjusting element 150 is thereby seated on the turret head 44 at a position provided for a tool and can thus be brought into a position facing the workpiece chuck 30 due to turning of the turret head about the turret axis 46 and, in addition, can be moved relative to the workpiece chuck 30 by means of the machine control due to displacement of the X slide 36 and the Z slide 34.

The actuating element 140 comprises, for its part, a head 144 which is provided at the end side with the receiving means 142, is non-rotatably mounted in the collet support 74 and is seated on a slide 146 which is mounted for displacement in a bore 148 in the collet support 74 parallel to the cylinder axis 76.

The head 144 is preferably arranged in a recess 162 of an end side 164 of the collet support 74 and the slide 146 passes through the entire collet support 74 parallel to the cylinder axis 76 so that the slide 146 faces the front end face 128 of the holding ring 120 with a rearward end face 164.

Furthermore, the slide is acted upon by a pressure spring 166, which, on the one hand, is supported on the collet support 74 and, on the other hand, acts against a ring 168 seated on the slide 146, such that the end face 164 abuts on the front end face 128 of the holding ring 120.

Moreover, the slide 146 is displaceable relative to the collet support 74 such that it is in a position to follow the movements of the holding ring 120 in the direction of the cylinder axis 76 during the clamping and releasing of the collet 82.

If the holding ring 120 is moved in the clamping direction 139S due to the action of the tension element 104, the slide 146 follows this movement and the head 144 thereof is likewise lowered into the recess 162.

Without any pressure action of the cocking cylinder 32, the pressure members 132 already described press the holding ring 120 in release direction 139L on account of the pressure springs 134 so that the slide 146 is displaced in the same direction and the head 144 moves in the direction of the end face 164.

In order to be able to adjust the eccentricity E for the workpiece to be machined during the clamping of the workpiece 50 in the collet 82, the adjusting element 150 with the pin 154 engages in the receiving means 142 when the workpiece 50 is clamped and the cocking cylinder 32 active and acts on the slide 146 in clamping direction 139S so that even when the cocking cylinder 32 is opened, i.e., switched to inactive and no longer acts with the tension element 104 on the holding ring 120 with force in clamping direction 139S, the holding ring 120 and thus the collet actuation 38 is prevented from moving in release direction 139L but rather remains in a holding position, wherein the force acting via the adjusting element 150 and the actuating element 140 is, however, smaller.

As a result, the workpiece 50 remains clamped by the collet 82 in the workpiece receiving means 90 but the clamping force is a fraction of the force exerted by the cocking cylinder 32, for example, is less than approximately 1%, even better less than 0.5% of the clamping force in the case of an active cocking cylinder.

This reduced clamping force does, however, have the advantage that with it the collet support 74 is no longer fixed in a force-locking manner in the chuck housing 70 but can turn relative to the chuck housing 70. This relative turning is brought about by the fact that the adjusting element 150 holds the collet support 74 securely with respect to any turning about the cylinder axis 76 on account of the pin 154 engaging in the receiving means 142 but the spindle motor 26, in this case operated by the machine control 38 as a controlled C axis, is turned through a defined angle so that the chuck housing 70 turns relative to the collet support 74 and thus a stepless adjustment of the eccentricity E is possible which results from the radial distance of the axis of symmetry 86 from the spindle axis 16.

As a result, the eccentricity of the collet 82 is adjustable in a stepless manner due to the controlled C axis between the eccentricity E equal to 0 illustrated in FIG. 4 as far as the eccentricity E equal to 2Δ.

The advantage of the inventive solution is, in addition, to be seen in the fact that the adjusting element 150 can be mounted in the tool support 40 instead of a tool and thus the pin 154 can be brought into engagement with the receiving means 142 as a result of movement of the X slide 36 and the Z slide 34 and, in addition, the adjusting element is in a position, due to action of the pin 154 on the receiving means 142 in the direction of engagement 156, not only to hold the collet support 74 securely and non-rotatably relative to the cylinder axis 76 during the turning of the chuck housing 70 but is, at the same time, in a position to keep the holding ring 120 acted upon in clamping direction 139S contrary to the force of the pressure members 132 and the pressure springs 134 so that the workpiece 50 remains clamped in the workpiece receiving means 90 of the collet 82 during the adjustment of the eccentricity E to such an extent that it retains its position relative to the collet 82.

As a result, the possibility is created of altering the eccentricity of the machining in a stepless manner during the machining of the workpiece 50 whilst maintaining the fixing of the workpiece 50 in the collet 82.

In order to clearly determine the position of the collet support 74 illustrated in FIG. 4 with eccentricity 0, i.e. when the axis of symmetry 86 coincides with the spindle axis 16, not only is the holding ring 120 held non-rotatably in the chuck housing 70 provided in the area of its front end face 128 but also the collet support 74 in the area of its end face 172 facing the end face 128 with a respective form-locking element 174, 176 of a mating pair of form-locking elements which, in the position with eccentricity 0 and the actuating element 140 not acted upon, can be brought into engagement in order to clearly determine the position with the eccentricity 0 on account of the force of the pressure members 132 and the pressure springs 134 when the cocking cylinder 132 is inactive.

In a second embodiment of an inventive workpiece chuck 30', illustrated in FIG. 7, those parts which are identical to those of the first embodiment have been given the same reference numerals and so with respect to the description thereof reference can be made in full to the comments on the first embodiment.

In contrast to the first embodiment, the collet support 74' in the second embodiment is not designed to be rotatable in the chuck housing 70' but to be displaceable linearly, namely in the direction at right angles to the plane of drawing of FIG. 7.

In this respect, the collet support 74 is preferably guided on parallel plane surfaces 174a and 174b on a guide member 176 of the chuck housing 70' for displacement at right angles to the plane of drawing in FIG. 7.

The collet support 74 also bears the actuating element 140 which is provided with the receiving means 142 for the pin 154 of the adjusting element 150 and, in addition, has a slide 146 which is displaceable in the direction of engagement 156 in order to act upon a pressure ring 178 which is securely connected to the tension element 104.

Furthermore, the collet 82 is connected to the front part 102' of the tension element 104 via the tension sleeve 92', wherein noses 180 engage in linear grooves 182a and 182b extending parallel to the guide surfaces 174a and 174b so that a displacement of the tension sleeve 92' at right angles to the plane of drawing in FIG. 7 is possible together with the collet support 74'.

As a result of action on the receiving means 142 by means of the pin 154, the pressure ring 178 can, on the one hand, be acted upon in the clamping direction in such a manner that the collet 82 keeps a workpiece 50 inserted into the workpiece receiving means 90 clamped and at the same time the collet support 74 is displaceable at right angles to the plane of drawing in FIG. 7 as a result of controlled movement of the pin 154 by the machine control 38, for example, as a result of movement of the X slide 36 in X direction such that the axis of symmetry 86 of the workpiece receiving means 90 is displaceable from a position congruent with the spindle axis 16 into a position located on ore side of the spindle axis 16 next to it and thus a workpiece 50 can be machined, with which the section 64 is rotationally symmetrical to the axis 66 which does not coincide with the workpiece axis 52 and thus also not with the axis of symmetry 86.

The advantage of the second embodiment, illustrated in FIG. 7, is to be seen in the fact that with it an adjustment of the collet support 74' in opposite directions can be realized, i.e., the axis of symmetry 86 of the workpiece receiving means 90 of the collet 82 is movable in the direction of two opposite, radial directions in relation to the spindle axis 16 and thus two eccentricities offset through 180° in relation to one another can be realized whereas, in the first embodiment, an eccentricity can be realized only in one radial direction relative to the spindle axis 16.

What is claimed is:

1. A machine tool for the turning of workpieces with eccentric sections, comprising:

a tool support movable in a direction of at least one axis, a workpiece spindle drivable for rotation about a spindle axis, said workpiece spindle comprising a workpiece chuck adapted to clamp a workpiece with a variably adjustable eccentricity in relation to the spindle axis, the workpiece chuck having a chuck housing, a collet actuation and a collet support arranged in the chuck housing and having a collet held therein, said collet being adapted to be brought into concentric or eccentric adjustable positions relative to the spindle axis as a result of movement of the collet support relative to the chuck housing, said machine tool having at least one axis provided for machining workpieces and controlled by a machine control, an adjusting element on the machine tool, said element being moveable towards the workpiece chuck for the adjustment of a respective adjustable position of the collet, and being adapted to be brought into operative connection with a receiving means connected to the collet support, and in the operative connection between the adjusting element and the collet support, the relative movement between the collet support and the chuck housing being controllable for changing the adjustable position via the machine control by controlling the at least one axis provided for machining work pieces.

2. A machine tool as defined in claim 1, wherein the adjusting element is movable by the machine control relative to the receiving means in a direction of engagement extending transversely to the direction of movement of the collet support relative to the chuck housing.

3. A machine tool as defined in claim 2, wherein the direction of engagement extends approximately parallel to the spindle axis.

4. A machine tool as defined in claim 1, wherein the workpiece chuck has an actuating element actuatable by the machine control for acting on the collet actuation in a clamping direction to maintain a holding position of the collet still holding the workpiece in the collet.

5. A machine tool as defined in claim 4, wherein the actuating element is actuatable due to external action on the workpiece chuck.

6. A machine tool as defined in claim 5, wherein the actuating element is actuatable by the tool support.

7. A machine tool as defined in claim 5, wherein the actuating element is actuatable by the adjusting element.

8. A machine tool as defined in claim 4, wherein the actuating element is arranged on the collet support and is movable together with it during the alteration of the adjustable position relative to the chuck housing.

9. A machine tool as defined in claim 4, wherein the actuating element bears the receiving means for the adjusting element.

10. A machine tool as defined in claim 4, wherein the actuating element is movable in the direction of engagement of the adjusting element.

11. A machine tool as defined in claim 4, wherein the actuating element is movable approximately parallel to the spindle axis.

12. A machine tool as defined in claim 1, wherein the adjusting element is held on the tool support movable by the machine control.

13. A machine tool as defined in claim 12, wherein the element is arranged in the tool support instead of a tool.

14. A machine tool as defined in claim 12, wherein the tool support is movable by the machine control in the direction of engagement of the adjusting element.

15. A machine tool as defined in claim 12, wherein the tool support is movable by the machine control transversely to the direction of engagement of the adjusting element.

16. A machine tool as defined in claim 1, wherein:
  a securing of the collet support in position relative to the machine base is achievable by means of the adjusting element, and
  the relative movement between the chuck housing and the collet support is achievable by means of a rotation of the workpiece spindle about the spindle axis controlled by the machine control.

17. A machine tool as defined in claim 1, wherein with a stationary workpiece spindle, a movement of the collet support relative to the chuck housing is achievable by means of the adjusting element, the collet support being movable by means of an axis controllable by the machine control and moving the adjusting element relative to the chuck housing.

18. A workpiece chuck for a tool spindle of a machine tool rotatable about a spindle axis, the workpiece being clampable in said chuck with a variably adjustable eccentricity in relation to the spindle axis,
  the workpiece chuck having a chuck housing, a collet actuation and a collet support arranged in the chuck housing, said collet support having a collet held in it, said collet being adapted to be brought into concentric or eccentric adjustable positions relative to the spindle axis as a result of movement of the collet support relative to the chuck housing,
  a receiving means being provided on the collet support for the adjustment of the adjustable positions of the collet,
  said receiving means being adapted to be brought into operative connection with an adjusting element of the machine tool, and
  in the operative connection between the adjusting element and collet support, relative movement between the collet support and the chuck housing being achievable for changing the adjustable position.

19. A workpiece chuck as defined in claim 18, wherein the operative connection between the receiving means and the adjusting element is brought about via form locking.

20. A workpiece chuck as defined in claim 19, wherein the form locking connection of the adjusting element and the receiving means is achievable by way of a relative movement in a direction of engagement extending transversely to the direction of movement of the collet support relative to the chuck housing.

21. A workpiece chuck as defined in claim 20, wherein the direction of engagement extends approximately parallel to the spindle axis.

22. A workpiece chuck as defined in claim 18, wherein the collet actuation is adapted to be acted upon in a clamping direction to maintain a holding position of the collet still holding the workpiece in the collet during the relative movement between the collet support and the chuck housing.

23. A workpiece chuck as defined in claim 22, wherein the workpiece chuck has an actuating element actuatable from outside said chuck, for acting on the collet actuation in a clamping direction to maintain a holding position of the collet still holding the workpiece in the collet.

24. A workpiece chuck as defined in claim 23, wherein the actuating element is actuatable as a result of external action on the workpiece chuck.

25. A workpiece chuck as defined in claim 23, wherein the actuating element is actuatable by means of the adjusting element.

26. A workpiece chuck as defined in claim 25, wherein the actuating element is arranged on the collet support and movable together with it during the alteration of the adjustable position relative to the chuck housing.

27. A workpiece chuck as defined in claim 26, wherein the actuating element bears the receiving means for the adjusting element.

28. A workpiece chuck as defined in claim 25, wherein the actuating element is movable in the direction of engagement of the adjusting element.

29. A workpiece chuck as defined in claim 25, wherein the actuating element is movable approximately parallel to the spindle axis.

30. A workpiece chuck as defined in claim 18, wherein:
  the collet support is rotatable in the chuck housing about an axis eccentric to the spindle axis, and
  the collet is arranged eccentrically to the axis with its axis of symmetry.

31. A workpiece chuck as defined in claim 18, wherein the collet support is displaceable linearly in the chuck housing.

32. A workpiece chuck as defined in claim 18, wherein the chuck is arranged in a machine tool for the turning of workpieces with eccentric sections, said machine tool comprising:

a tool support movable in a direction of at least one axis, a workpiece spindle drivable for rotation about a spindle axis, said workpiece spindle comprising said workpiece chuck adapted to clamp a workpiece with a variably adjustable eccentricity in relation to the spindle axis, said machine tool having at least one axis controlled by a machine control, said adjusting element being provided on the machine tool, said adjusting element being movable towards the workpiece chuck and being adapted to be brought into operative connection with a receiving means connected to the collet support for the adjustment of a respective adjustable position of the collet and in the operative connection between the adjusting element and the collet support, the relative movement between the collet support and the chuck housing being controllable for altering the adjustable position via the machine control by way of the at least one controlled axis.

33. A machine tool for the turning of workpieces with eccentric sections, comprising:

a tool support movable in a direction of at least one axis, a workpiece spindle drivable for rotation about a spindle axis, said workpiece spindle comprising a workpiece chuck adapted to clamp a workpiece with a variably adjustable eccentricity in relation to the spindle axis, the workpiece chuck having a chuck housing, a collet actuation and a collet support arranged in the chuck housing and having a collet held therein, said collet being adapted to be brought into concentric or eccentric adjustable positions relative to the spindle axis as a result of movement of the collet support relative to the chuck housing, said machine tool having at least one machining axis out of at least one of a turret axis and a rotary axis of the workpiece chuck controlled by a machine control, an adjusting element on the machine tool, said element being moveable towards the workpiece chuck for the adjustment of a respective adjustable position of the collet, and being adapted to be brought into operative connection with a receiving means connected to the collet support, and in the operative connection between the adjusting element and the collet support, the relative movement between the collet support and the chuck housing being controllable for changing the adjustable position via the machine control by controlling the at least one machining axis out of at least one of a turret axis and a rotary axis of the workpiece chuck.

* * * * *